United States Patent [19]

Ishii et al.

[11] Patent Number: 4,976,805
[45] Date of Patent: Dec. 11, 1990

[54] PROCESS FOR MANUFACTURE OF DECORATIVE INTERMEDIATE FILMS FOR USE IN LAMINATED GLASS SHEETS

[75] Inventors: Sumio Ishii, Otsu; Tetsuya Fukuda, Kyoto; Nobumoto Kani, Kawaguchi, all of Japan

[73] Assignee: Dai Nippon Insatsu Kabushiki Kaisha, Japan

[21] Appl. No.: 278,290

[22] PCT Filed: Mar. 9, 1988

[86] PCT No.: PCT/JP88/00244

§ 371 Date: Nov. 7, 1988

§ 102(e) Date: Nov. 7, 1988

[87] PCT Pub. No.: WO88/07027

PCT Pub. Date: Sep. 22, 1988

[30] Foreign Application Priority Data

Mar. 9, 1987 [JP] Japan .................................. 62-53245

[51] Int. Cl.$^5$ ............................................ B32B 17/00
[52] U.S. Cl. ..................... 156/100; 156/235; 156/236; 156/240; 428/204
[58] Field of Search ................... 156/70, 71, 100, 106, 156/230, 233, 235, 236, 240, 241, 249, 292, 300, 308.6, 313, 324.4; 8/468, 471; 427/322, 208; 428/201, 204, 210, 437, 918, 913.3

[56] References Cited

U.S. PATENT DOCUMENTS

| | | | |
|---|---|---|---|
| 3,918,895 | 11/1975 | Mizuno | 8/468 |
| 4,173,672 | 11/1979 | Mannheim | 156/235 |
| 4,642,255 | 2/1987 | Diabak | 156/100 |
| 4,770,732 | 9/1988 | Steelman | 156/236 |

FOREIGN PATENT DOCUMENTS 57-42518 4/1976 Japan .
56-45777 10/1981 Japan .

Primary Examiner—John J. Gallagher
Assistant Examiner—Louis Falasco
Attorney, Agent, or Firm—Arnold, White & Durkee

[57] ABSTRACT

A process for the manufacture of decorative intermediate films used in laminated glass sheets which comprises the following steps: (a) forming a transfer sheet with a desired printed pattern printed over a transfer sheet substrate with an ink capable of dyeing an intermediate film made of a thermoplastic resin and used in a laminated glass sheet; (b) applying over the printed pattern surface of the transfer sheet thus obtained and/or the surface of the intermediate film, a solvent composition capable of softening to some extent the vehicle of the printing ink and the intermediate film; (c) superposing the surface of the printed pattern over the surface of the intermediate film through the solvent-composition-coated surface and then pressing them against each other at a low temperature less than the glass transition point of the intermediate film, thereby transferring and impregnating the printed pattern over and into the surface of the intermediate film; and (d) separating the transfer sheet substrate from the intermediate film and drying the intermediate film, thereby obtaining a decorative intermediate film for use in a laminated glass sheet. When the decorative intermediate film manufactured through the above-described steps is laminated between glass plates, no air bubbles remain and a uniform coloring effect can be attained so that the glass products having an attractive outer appearance can be obtained.

12 Claims, 11 Drawing Sheets

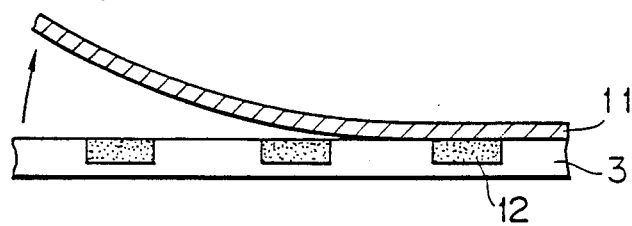
F I G. 4
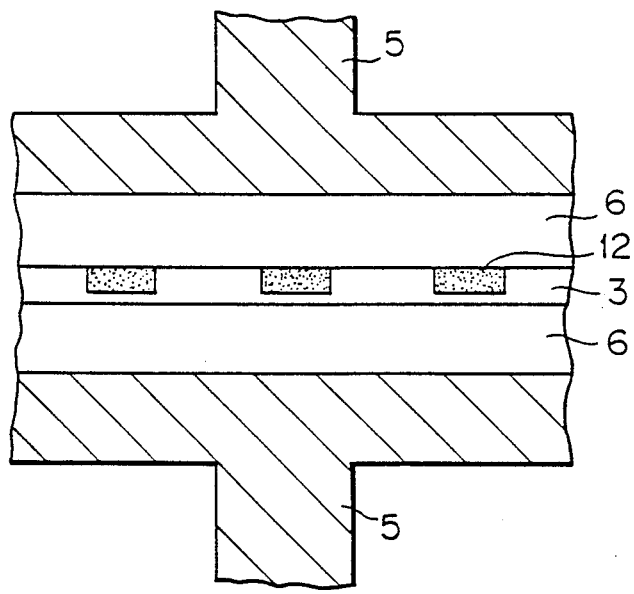
F I G. 5
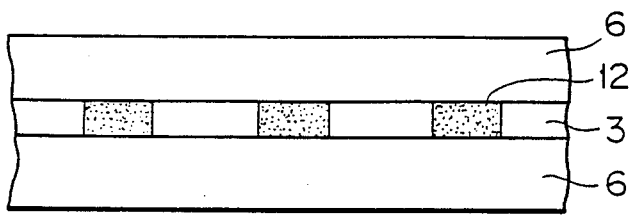
F I G. 6

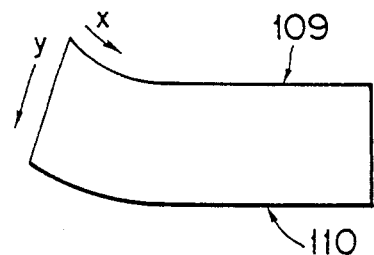
F I G. 11
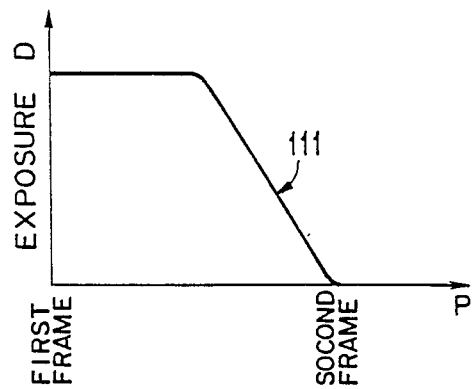
F I G. 13
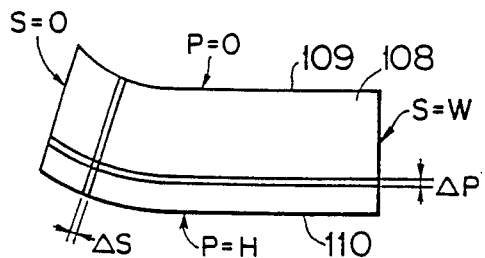
F I G. 12
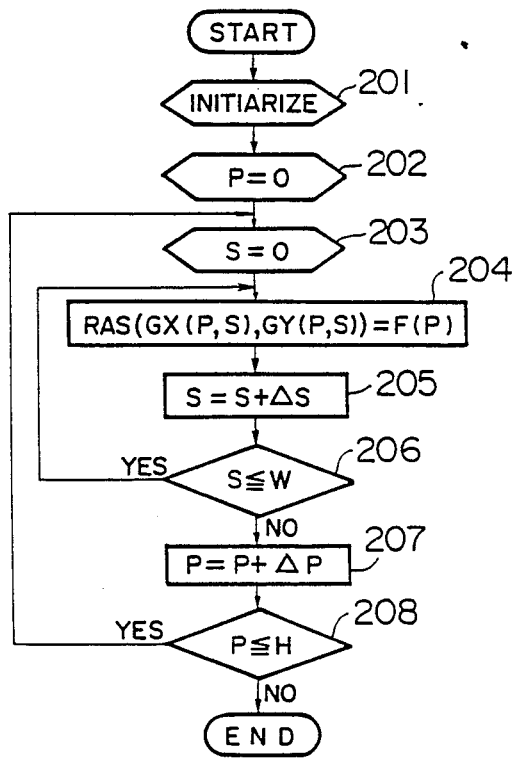
F I G. 14

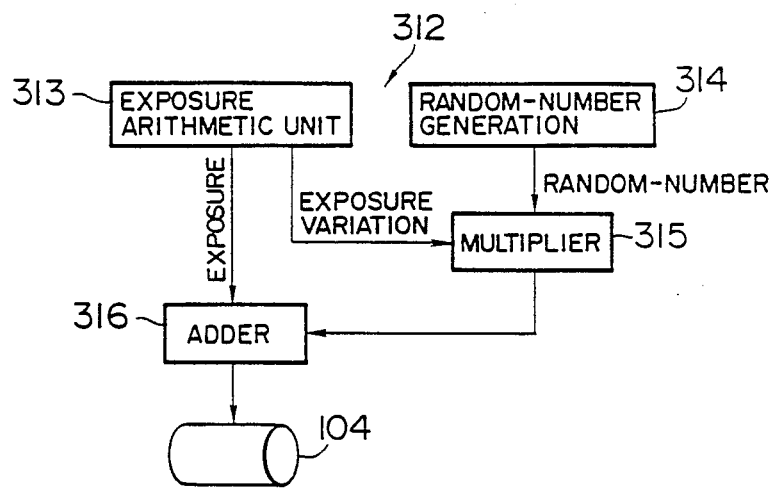
FIG. 15
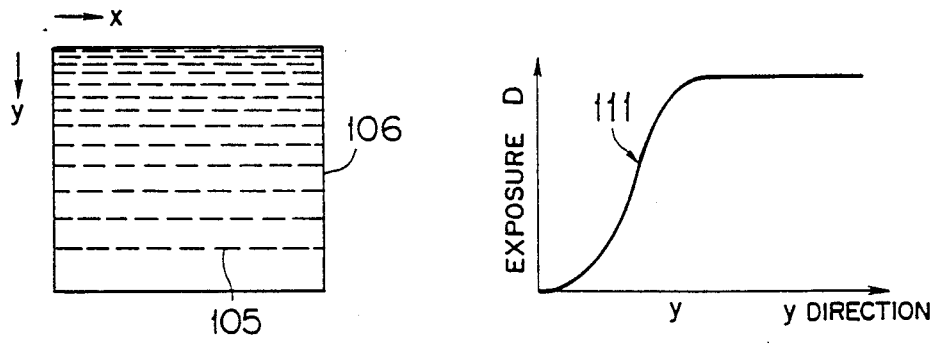
FIG. 16       FIG. 17
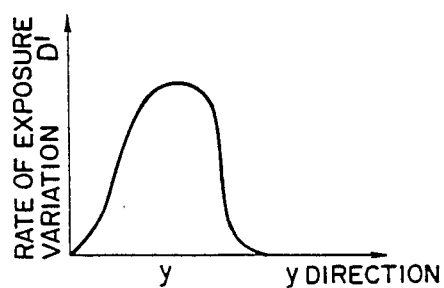    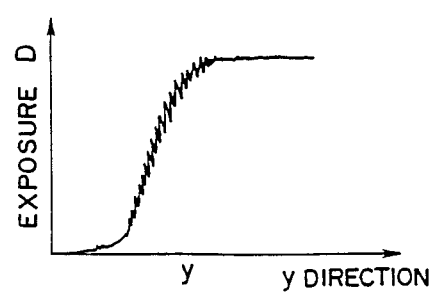
FIG. 18       FIG. 19

|   | x → |   |   |   |   |   |   |   |   |   |   |   |   |   |   |   |
|---|---|---|---|---|---|---|---|---|---|---|---|---|---|---|---|---|
|   | 1 | 2 | 3 | 4 | 5 | 6 | 7 | 8 | 9 | 10 | 11 | 12 | 13 | 14 | 15 | 16 |
| ↓ 1 | 0.7 | 0.8 | 0.9 | 1.0 | 1.1 | 1.2 | 1.3 | 1.4 | 1.5 | 1.6 | 1.7 | 1.8 | 1.9 | 2.0 | 2.1 | 2.2 |
| y 2 | 0.7 | 0.8 | 0.9 | 1.0 | 1.1 | 1.2 | 1.3 | 1.4 | 1.5 | 1.6 | 1.7 | 1.8 | 1.9 | 2.0 | 2.1 | 2.2 |
| 3 | 0.7 | 0.8 | 0.9 | 1.0 | 1.1 | 1.2 | 1.3 | 1.4 | 1.5 | 1.6 | 1.7 | 1.8 | 1.9 | 2.0 | 2.1 | 2.2 |
417   423   423   423
F I G. 20
|   | x → |   |   |   |   |   |   |   |   |   |   |   |   |   |   |   |
|---|---|---|---|---|---|---|---|---|---|---|---|---|---|---|---|---|
|   | 1 | 2 | 3 | 4 | 5 | 6 | 7 | 8 | 9 | 10 | 11 | 12 | 13 | 14 | 15 | 16 |
| ↓ 1 | 0 | 0 | 0 | 1 | 1 | 1 | 1 | 1 | 1 | 1 | 1 | 1 | 1 | 2 | 2 | 2 |
| y 2 | 0 | 0 | 0 | 1 | 1 | 1 | 1 | 1 | 1 | 1 | 1 | 1 | 1 | 2 | 2 | 2 |
| 3 | 0 | 0 | 0 | 1 | 1 | 1 | 1 | 1 | 1 | 1 | 1 | 1 | 1 | 2 | 2 | 2 |
418   423   423   423
F I G. 21
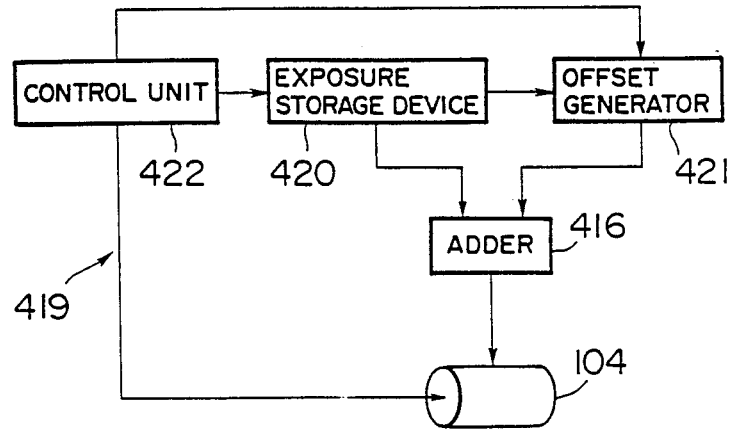
F I G. 22

FIG. 23

| y \ x | ODD NUMBER | EVEN NUMBER |
|---|---|---|
| ODD NUMBER | 0 | 0.5 |
| EVEN NUMBER | 0.75 | 0.25 |

FIG. 24

| y \ x | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 0.5 | 0 | 0.5 | 0 | 0.5 | 0 | 0.5 | 0 | 0.5 | 0 | 0.5 | 0 | 0.5 | 0 | 0.5 |
| 2 | 0.75 | 0.25 | 0.75 | 0.25 | 0.75 | 0.25 | 0.75 | 0.25 | 0.75 | 0.25 | 0.75 | 0.25 | 0.75 | 0.25 | 0.75 | 0.25 |
| 3 | 0 | 0.5 | 0 | 0.5 | 0 | 0.5 | 0 | 0.5 | 0 | 0.5 | 0 | 0.5 | 0 | 0.5 | 0 | 0.5 |

FIG. 25

| y \ x | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0.7 | 1.3 | 0.9 | 1.5 | 1.1 | 1.7 | 1.3 | 1.9 | 1.5 | 2.1 | 1.7 | 2.3 | 1.9 | 2.5 | 2.1 | 2.7 |
| 2 | 1.45 | 1.05 | 1.65 | 1.25 | 1.85 | 1.45 | 2.05 | 1.65 | 2.25 | 1.85 | 2.45 | 2.05 | 2.65 | 2.25 | 2.28 | 2.45 |
| 3 | 0.7 | 1.3 | 0.9 | 1.5 | 1.1 | 1.7 | 1.3 | 1.9 | 1.5 | 2.1 | 1.7 | 2.3 | 1.9 | 2.5 | 2.1 | 2.7 |

FIG. 26

| y \ x | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 1 | 0 | 1 | 1 | 1 | 1 | 1 | 1 | 2 | 1 | 2 | 1 | 2 | 2 | 2 |
| 2 | 1 | 1 | 1 | 1 | 1 | 1 | 2 | 1 | 2 | 1 | 2 | 2 | 2 | 2 | 2 | 2 |
| 3 | 0 | 1 | 0 | 1 | 1 | 1 | 1 | 1 | 1 | 2 | 1 | 2 | 1 | 2 | 2 | 2 |

PROCESS FOR MANUFACTURE OF DECORATIVE INTERMEDIATE FILMS FOR USE IN LAMINATED GLASS SHEETS

TECHNICAL FIELD

The present invention relates to an improvement of a process for the manufacture of decorative intermediate films for use in laminated glass sheets such as windshields of automotive vehicles.

BACKGROUND ART

As is well known in the art, the windshields for automotive vehicles are comprised of two sheets of glass with a thermoplastic substance, typically polyvinylbutyral intermediate film interposed therebetween bonded integral into one sheet of glass so that the scattering of broken glass pieces resulting from the damage of the windshield can be prevented.

Frequently, a portion of an intermediate film is colored so that the windshields may have the additional function of sun visors.

Of the various methods for dyeing decorative intermediate films for laminated glass sheets, a transfer method (disclosed, for instance in Japanese Patent Publication Nos. 55-14821 and 57-29426) has been used. According to this method, a transfer sheet, which is extended over a surface of a substrate and is printed with an ink capable of dyeing an intermediate film, is superposed over an intermediate film, and then is subjected to a heating and pressure application process so that the printing ink is transferred over the intermediate film. After the separation of the substrate and ageing or only after ageing, the printed pattern is transferred over the surface of the intermediate film.

However, according to the above-described method, in the process of applying heat and pressure to an intermediate film in the transfer method, it frequently occurs that fine projections and recesses formed over the surface of the intermediate film disappear so that this method has the defect that air bubbles tend to be left when the intermediate film thus obtained is laminated to a sheet of glass. That is, unless such fine projections and recesses over the surface of the intermediate film are left in order to carry out the deairing operation when the glass sheets are laminated, defective articles containing air bubbles are frequently produced, and consequently, the yield is decreased.

Furthermore, in the conventional processes for manufacture of intermediate films, the penetration of ink is limited to the portion immediately adjacent to the surface of a glass sheet so that the overall surface of the intermediate film is not satisfactorily dyed, and consequently, there arises the problem that the outer appearance of the finished product is degraded. That is, in the case of forming a coloring pattern, the conventional processes are limited in their capability of forming a high-quality printed pattern (for instance, a vignette pattern).

DISCLOSURE OF THE INVENTION

An object of the present invention is therefore to provide a process for the manufacture of intermediate films which are attractively and uniformly dyed and have a high degree of decorative capability for laminated glass sheets.

A process for manufacture of intermediate films for laminated glass sheets in accordance with the present invention comprises the following steps:

(a) forming a transfer sheet having a desired printing pattern by printing a transfer sheet substrate with an ink capable of dyeing an intermediate film made of a thermoplastic resin for a laminated glass sheet;

(b) applying to a printed pattern surface, and/or the surface of the transfer sheet thus obtained, a solvent capable of softening to some extent the vehicle of the printing ink and the intermediate film;

(c) superposing the printed pattern surface over the intermediate film through the coating surface of the solvent and then pressing them at a low temperature below a glass transition point of the intermediate film, thereby transferring and impregnating the printed pattern over and into the surface of the intermediate film; and (d) separating the transfer sheet substrate from the intermediate film and drying the intermediate film, thereby obtaining a decorative intermediate film used in a laminated glass sheet.

According to the present invention, intermediate films having fine projections and recesses formed on both surfaces thereof and made of polyvinylbutyral are preferably used.

Furthermore, according to the present invention, for an intermediate film for a laminated glass sheet such as a windshield for an automotive vehicle, it is possible to freely define a desired gradation pattern (vignette pattern) depending upon the shape of the windshield. As described above, the present invention may be used to effectively define such gradation, and therefore, a method for defining such gradation pattern is also within the scope of the present invention.

BRIEF DESCRIPTION OF THE DRAWINGS

FIGS. 1, 2, 3 and 4 are schematic sectional views used to explain the steps of a process for the manufacture of decorative intermediate films for use in laminated glass sheets in accordance with the present invention;

FIGS. 5 and 6 are also schematic sectional views used to explain the steps of the fabrication of laminated glass sheets by using decorative intermediate films obtained by the process of manufacture thereof in accordance with the present invention;

FIGS. 10–12 are top views illustrating the data for the shape of a laminated glass sheet to be fabricated;

FIG. 13 is a graph illustrating the exposure curve;

FIG. 14 is a flowchart illustrating the steps for determining picture elements or pixels and exposure;

FIG. 15 is a block diagram showing the construction of a quasi-boundary line elimination device;

FIG. 16 is a top view showing a gradation pattern;

FIGS. 17 and 19 are graphs illustrating the exposure curves, respectively;

FIG. 18 is a graph illustrating the variation of exposure;

FIG. 20 is a view showing the values of the computation data assigned to the picture elements or pixels, respectively;

FIG. 21 is a view showing the integers obtained by rounding off the computation data shown in FIG. 20;

FIG. 22 is a block diagram showing the construction of a device for carrying out the quasi-increase of gradation;

FIG. 23 is a diagram showing reference offsets;

FIG. 24 is a view illustrating the reference offsets assigned to the picture elements, respectively;

FIG. 25 is a view illustrating the values obtained by the addition of offsets to the computation data of the picture elements, respectively;

FIG. 26 is a view illustrating the integers obtained by rounding off the values shown in FIG. 25;

DETAILED DESCRIPTION OF THE PREFERRED EMBODIMENTS

The process for manufacture of decorative intermediate films for use in laminated glass sheets comprises the steps shown in FIGS. 1–4

Figure 1:
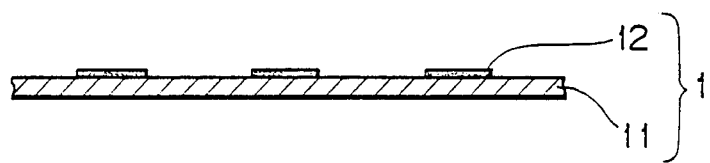
Figure 2:
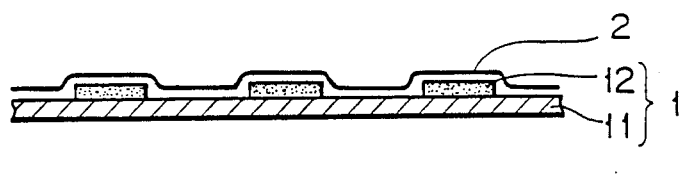
Figure 3:
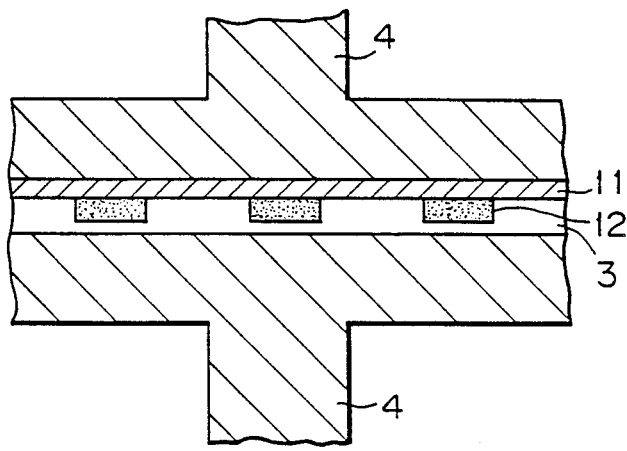

(a) As shown in FIG. 1, the step for forming a desired pattern 12 printed over the surface of a transfer sheet substrate 11 with an ink capable of dyeing a thermoplastic resin intermediate film for use in a laminated glass sheet;

(b) As shown in FIG. 2, the step for coating over the surface of the printed pattern 12 or the surface of an intermediate sheet (not shown) with a solvent composition 2 capable of softening to some extent, the vehicle of the printing ink and the intermediate film;

(c) As shown in FIG. 3, the step for superposing the surface of the printed pattern 12 over the intermediate film 3 through the coating surface of the solvent composition 2 and then pressing them by, for instance, a flattening press 4 in FIG. 3 at a temperature of a glass transition point of the intermediate film, to thereby transfer and impregnate the printed pattern 12 over and into the surface of the intermediate film 3; and (d) As shown in FIG. 4, the step for separating the transfer sheet substrate 11 from the intermediate film 3 and drying the intermediate film 3, thereby obtaining a decorative intermediate film for use in a laminated glass sheet.

Next, according to the modes of the present invention, the component materials and the manufacturing steps will be described in detail.

Transfer sheets

As the transfer sheet substrates, various kinds of paper, cellophane, synthetic resin films or sheets, metal foils or sheet metal and laminated materials consisting of the above-described materials may be used. Of these materials, in the present invention it is preferable to use impermeable sheets such as coat paper. When such impermeable sheets are used, the degree of ink transfer efficiency can be improved in the transfer step and the non-uniform transfer problem can be eliminated.

Any suitable conventional printing methods such as the gravure printing may be used to print a predetermined pattern on the substrate. The method for printing the gradation pattern in accordance with the process of the present invention will be described below.

Printing inks consist of dyes capable of dyeing the intermediate films which are the objects to be transferred, vehicles and solvents as major components.

As the dyes contained in the inks, dyes or pigments having light resistance, heat resistance and light-absorbing-capability are preferably used.

Dyes used in practice are as follows: A first group consisting of disperse dyes, including:

"Disperzol Red B-3B", the trademark of the product of ICI, Japan,

"Miketon Polyester Violet BN", the trademark of the product of Mitsui Toyo Corp., Japan, "Kayaset Blue A-2R", the trademark of the product of Nippon Kayaku Corp., Japan, and "Sumiplastred AS", the trademark of the product of Sumitomo Kagaku Corp., Japan, and a second group consisting of pigments, and including:

"Matsumin Neo Yellow M 3G", the trademark of the product of Matsui Shikiso Corp., Japan, "Matsumin Neo Blue MR", the trademark of the product of Matsui Shikiso Corp., Japan, and "Matsumin Neo Green MB", the trademark of the product of Matsui Shikiso Corp., Japan.

Furthermore, the pigments whose transmissivity is in the lower half range of the visible-light wavelength (0.4–0.7 microns) are preferably used because even though they are pigments, the degree of transparency can be enhanced.

The following dyes are satisfactorily used in the present invention.

For instance, azo series, anthraquinone series, nitrodiphenylamine series and methyne series disperse dyes such as described below may be used.

C.I. Disperse Yellow 64
C.I. Disperse Red 60
C.I. Disperse Red 112
C.I. Disperse Blue 56
C.I. Disperse Blue 56
C.I. Disperse Blue 87
C.I. Disperse Yellow 109
C.I. Disperse Yellow 42
C.I. Disperse Yellow 60
C.I. Disperse Yellow 7
C.I. Disperse Yellow 54
C.I. Disperse Red 153
C.I. Disperse Red 157
C.I. Disperse Red 147
C.I. Disperse Red 152
C.I. Disperse Violet 52
C.I. Disperse Violet 36
C.I. Disperse Violet 1
C.I. Disperse Blue 145
C.I. Disperse Blue 158
C.I. Disperse Blue 54
C.I. Disperse Blue 27
C.I. Disperse Blue 83

The basic dyes used in the present invention are as follows:

C.I. Basic Yellow 13
C.I. Basic Blue 75
C.I. Basic Green 4
C.I. Basic Blue 105

The azo series metal complex dyes which may be used in the present invention are as follows:

C.I. Acid Yellow 127
C.I. Acid Yellow 161
C.I. Acid Orange 122
C.I. Acid Brown 296
C.I. Acid Brown 297
C.I. Acid Red 317
C.I. Acid Red 315
C.I. Acid Red 256
C.I. Acid Green 75
C.I. Acid Blue 229
C.I. Acid Blue 170
C.I. Acid Black 112

The following monoazo series, anthraquinone series, disazo series, phthalocyanine series and oxazine series reactive dyes may be used.

C.I. Reactive Yellow 1
C.I. Reactive Yellow 22
C.I. Reactive Yellow 7
C.I. Reactive Orange 14
C.I. Reactive Orange 1
C.I. Reactive Red 2
C.I. Reactive Red 11
C.I. Reactive Brown 23
C.I Reactive Violet 8
C.I. Reactive Blue 4
C.I. Reactive Blue 32
C.I. Reactive Blue 1
C.I. Reactive Green 6

The following azo series and anthraquinone series acid dyes are used:

C.I. Acid Yellow 25
C.I. Acid Blue 113
C.I. Acid Blue 40
C.I. Acid Red 266

The tolidine series and azo series direct dyes as described below may be used.

C.I. Direct Yellow 39
C.I. Direct Yellow 50
C.I. Direct Yellow 86
C.I. Direct Brown 195
C.I. Direct Violet 66
C.I. Direct Green 80
C.I. Direct Orange 39
C.I. Direct Red 89
C.I. Direct Blue 201
C.I. Direct Black 118
C.I. Direct Black 154

In addition to the above-described dyes, heat-sensitive coloring dyes which change their color when heated in excess of a predetermined temperature and which have the following compositions may be used.

| (Example 1) | |
|---|---|
| C.I. Basic Red 15 | 1.0 part |
| Zinc benzensulfonate | 2.0 parts |
| n-Myristyl alcohol | 400.0 parts |
| (Example 2) | |
| C.I. Disperse Violet 38 | 1.0 part |
| p-Toluene sulfonic acid | 4.0 parts |
| n-Docosyl alcohol | 400.0 parts |
| (Example 3) | |
| C.I. Basic Blue 3 | 1.0 part |
| Benzensulfonic acid | 4.0 parts |
| n-Stearyl alcohol | 400.0 parts |

As the vehicles of the printing inks, the conventional ink vehicles and paint substances may be used. For instance, various natural and modified resins, synthetic resins such as rosin-denatured phenol resin, phenol resin, maleic acid resin, alkid resin, vinyl resin, acrylic resin, polyamide, epoxy resin, aminoalkyd resin, polyurethane, polyvinylbutyral, polyvinylformal and so on; derivatives of rubber such as rubber chloride, cyclized rubber and so on; and derivatives of cellulose such as nitrocellulose, ethylcellulose and so on. Of the above-described substances, it is particularly preferable to use polyvinylbutyral because the adhesive force and transmissivity of the intermediate film after the transfer step are not degraded. Furthermore, according to the present invention, in order to ensure a high degree of adhesiveness, it is preferable that a printing ink and an intermediate film have common components.

As solvents for printing inks, cyclohexanol, ethyl acetate, toluene and the like may be used.

If required, a plasticizer may be added into printing inks.

Furthermore, in the process in accordance with the present invention, in order to improve the adhesive force and the separability after the transfer step, the surface of the substrate may be subjected to the primer coating processing.

Intermediate Films

The most suitable thermoplastic intermediate film is a polyvinylbutyral sheet having fine projections and recesses formed on both surfaces thereof.

When such intermediate film is used as an intermediate film in a windshield of an automotive vehicle, the intermediate film is preferably 0.2–2.0 mm in thickness and more preferably 0.5–1.0 mm in thickness and furthermore, fine projections and recesses formed on the surfaces of the intermediate film are preferably 5–100 microns and more preferably 20–30 microns.

Solvent

It is essential that the solvent used in the transfer step have the capability of not only (1) softening the vehicle in the ink layer on the surface of the transfer sheet to the desired extent but also (2) softening to the desired extent the intermediate film which is an object to be transferred, but have not the capability of excessively solving the vehicle and the intermediate film so that fine projections and recesses on the surfaces of the intermediate film will disappear.

Such solvent compositions which soften the vehicle of a printing ink and an intermediate film are maintained in the softened state until the printed ink and the intermediate film are superposed one upon another and then pressed against each other. Furthermore, they maintain such volatility that they are evaporated. In addition, the solvent compositions may contain a suitable plasticizer, a synthetic resin and the like in addition to a solvent.

The following solvents may be used in practice: methanol, ethanol, n-propanol, i-propanol, n-butanol, sec-butanol, n-octanol, diacetone alcohol, methylcellosolve, ethylcellosolve, butylcellosolve, acetone, methylethyl ketone, cyclohexanone, isophorone, N,N-dimethyl acetoamide, tetrahydrofuran, methylene chloride, chloroform, pyridine, dimethylsulfoxide, acetic acid, cyclohexanol and the like. The following plasticizers may be added to these solvents: phthalic acid esters, phosphoric acid esters, adipic acid esters, sebacic acid esters, azelaic acid esters, citric acid esters, glycol acid esters, ricinoleitic acid esters, polyester, epoxy, chloride and the like.

As the synthetic resins additionally added into a solvent composition, resins similar to those used as the vehicles of printing inks may be used. The addition of such resins into the solvent composition is effective to suitably adjust the degree of viscosity of the solvent composition.

Meanwhile, prior to the transfer step, the solvent is applied to the surface of the printed pattern on one surface of an intermediate film, but it is to be understood that the solvent may be applied to the surface of the intermediate film.

Conditions in Manufacturing Steps

The decorative intermediate films for use in laminated glass sheets are fabricated by using the above-described components and by following the above-mentioned procedure, but according to the present invention, it is essential that one of the above-described solvent compositions be used and that the following transfer step be carried out at low temperatures.

The conditions required for pressing in the transfer step are that the variation in thickness of the intermediate film must be less than 10% and that variations in fine projections and recesses over the surfaces of the intermediate film must also be less than 10%.

In order to maintain the above-described conditions, the conditions in the case of applying pressure, the pressure is from 0.1 to 10 kg/cm$^2$ and more preferably from 0.3 to 5 kg/cm$^2$ and the pressure application time period is from 10 to 90 seconds. In the pressure application step, the temperature must be maintained lower than the glass transition point (55–90° C.) of the intermediate film (in the case of a film made of polyvinylbutyral) and preferably at 0°–30° C. and more preferably 20°–25° C.

Any conventional suitable pressure application means may be used in the pressure application step, but in practice, suitable devices such as flattening presses, roll presses and the like can be used.

Manufacture of Laminated Glass Sheets

The manufacture of laminated glass sheets with the decorative intermediate films fabricated in the manner described above will be described. First, as shown in FIG. 5, according to a conventional method for manufacturing laminated glass sheets, one intermediate film 3 is interposed between two glass sheets 6, which in turn are heated and pressed by flattening press dies 5 so that they are bonded together by the intermediate film and concurrently, the printed pattern 12 is impregnated into the intermediate film 3.

The laminated glass sheet thus obtained is left in the atmosphere at 55° C. for, for instance, five days and aged, whereby, as shown in FIG. 6, a laminated glass sheet in which the dye is impregnated or permeated to the rear surface of the decorative intermediate film can be obtained.

In the case of the manufacture of decorative intermediate films in accordance with the present invention, the printing ink on the substrate which is in the softened state is superposed on the intermediate film and pressed at low temperatures so that the printing ink is easily transferred over and impregnated or permeated into the surface of the intermediate film in an easy manner The temperature is maintained low and no high pressure is applied so that the disappearance of fine projections and recesses formed over both surfaces of the intermediate film can be almost completely avoided. As a result, when the decorative intermediate film is bonded to the glass sheets, the de-airing operation can be satisfactorily carried out so that no air bubbles are left. Furthermore, the intermediate film fabricated in accordance with the present invention is considerably impregnated with the printing ink, that is, the dye, so that in the steps for bonding two glass sheets into a laminated glass sheet and ageing, the printing ink further diffuses and permeates to the rear surface of the intermediate film, whereby the printing ink is uniformly distributed throughout the whole thickness of the intermediate film. In this manner, the intermediate film can be satisfactorily colored.

Definition of Gradation Patterns

The present invention exhibits its excellent effects and features when a gradation pattern is defined in the windshield of an automotive vehicle.

The gradation pattern consists of a vignette pattern in which the color density is decreased at a uniform density gradient from the upper portion to the lower portion of the windshield. So far, in order to define such gradation over the surface of the intermediate film, there has been used a method in which, for instance, a photosensitive film which is an original is overlaid with a light-shielding plate and the exposure is carried out while the shielding plate is displaced at a predetermined slow speed.

According to the method of the type described above, however, in order to obtain a desired gradation pattern, the displacement rate of the light shielding plate, the exposure and other conditions must be strictly controlled so that skilled technique is required. Furthermore, according to the above-mentioned prior method, it is impossible to obtain a pattern in which the density gradient varies so as to be adjusted to the shape of the windshield, so that only unnatural patterns are obtained.

According to the present invention, it becomes possible to form gradation patterns corresponding to any shapes by a method to be described hereinafter.

Figure 7:
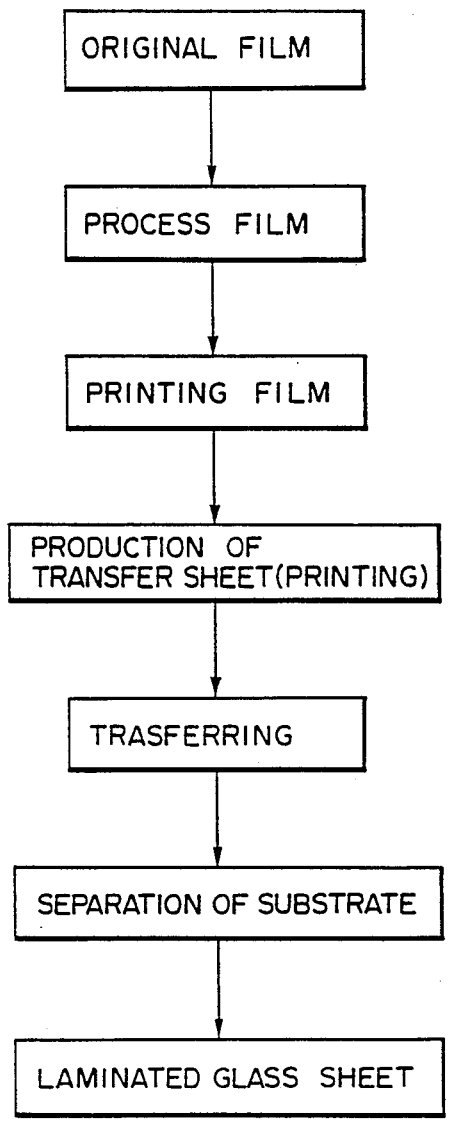
FIG. 7 is a flowchart showing the process of manufacture of decorative intermediate films in accordance with the present invention.

The process for manufacture of windshields in which desired gradation patterns are formed by the method in accordance with the present invention comprises, as shown in FIG. 7, a step for preparing an original film, a step for preparing a process film and a step for making a printing film. Furthermore, a decorative intermediate film having a predetermined gradation pattern, is produced by the step for preparing a transfer sheet (the printing step), the transfer step with the use of a solvent and the step for separating the substrate. By using the decorative intermediate film thus obtained, the laminated glass sheet is produced through predetermined steps.

In the original preparation step, depending upon the shape of a desired windshield and the density gradient, gradation pattern information is produced. According to the thus-obtained gradation pattern information, a gradation pattern is defined on the original film. In the process film preparation step, a positive or negative plate for making a printing pattern is prepared.

Next, a method for making an original plate (film) by digital processing will be described.

Method (1)

The step for defining a gradation pattern on an original film will be first described, but prior to the explanation of this step, a gradation defining device for forming a gradation pattern on an original film will be described.

A gradation pattern is defined as a pattern which gradually changes on the original film from a high density portion to a low density portion.

Figure 8:
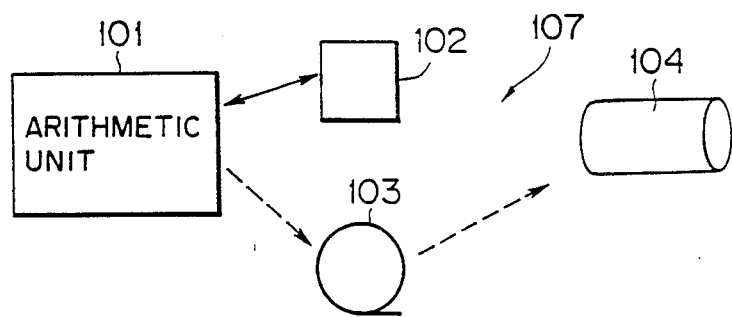
FIG. 8 is a block diagram illustrating the construction of a gradation defining device.
Figure 9:
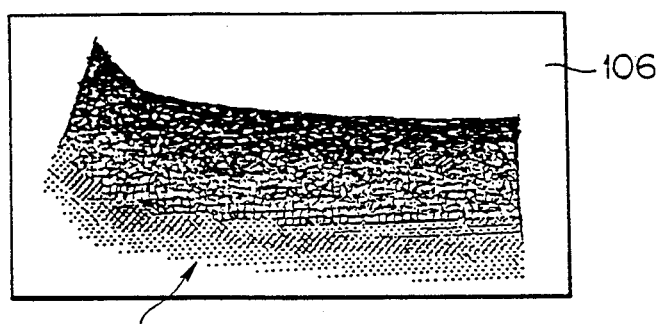
FIG. 9 is a top view of a gradation pattern.
Figure 10:
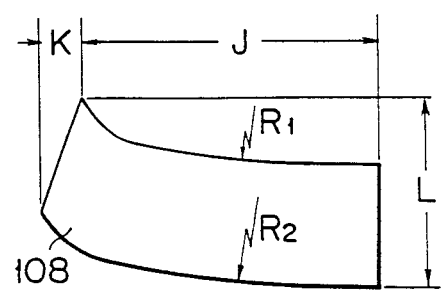

As shown in FIG. 8, the gradation pattern defining device comprises an arithmetic unit 101, a main storage unit 102, an auxiliary storage unit 103 and a digital scanner 104. An arithmetic operation program is incorporated into the arithmetic unit 101 and forms the raster data for defining a gradation pattern as shown in FIG. 9. The raster data consisting of a plurality of picture elements or pixels and derived from the arithmetic unit 101 is stored in the main storage unit 102 and each picture element has a different exposure, but instead of the exposure, the picture element may have a parameter corresponding to the exposure thereof. The auxiliary storage unit 103 stores therein the raster data to be output to the digital scanner 104 which in turn delivers the raster data to a photosensitive film so that the original film 106 having a gradation pattern 105 is prepared.

Referring next to FIGS. 10–14, the process for defining the gradation pattern 105 as shown in FIG. 9 on the original film 106 by the gradation pattern defining device 107 with the above-described construction will be explained.

The shape data, consisting of the radii (R1 and R2) of curvature of a glass plate 108 upon which is printed a gradation, the sizes (L, J and K) and the curved line components, is entered into the arithmetic unit 101. The shape data may be the data entered from a keyboard in a conversational or interactive mode, or it may be the data previously stored in the arithmetic operation program.

Referring next to FIG. 11, the definition of picture elements in response to the input shape data will be described. In FIG. 11, the horizontal direction is denoted by "x"; the vertical direction, by "y"; a variable in the vertical direction from a first outer frame 109 to a second outer frame 110, by "p"; and a variable in the horizontal direction from the left end to the right end in FIG. 11, by "s". The following functions can then be obtained:

$$x = GX(p,s) \quad (1)$$

and $$y = GY(p,s) \quad (2)$$

The variable p changes its value from 0 to H while the variable s changes its value from 0 to W. When the values of the variables p and s are varied in Eqs. (1) and (2), the curved surface of the glass plate 108 is divided in the form of a grid by the vertical and horizontal components (x,y). The intersections between the vertical and horizontal components are defined as picture elements (x,y).

Furthermore, in FIG. 11, of the shape data input on the basis of the curved lines of the outer and inner frames 109 and 110, it is defined that the picture elements (x,y) have the same density when the variation of the value s is equal to the variation of the value p in Eqs. (1) and (2). That is, the equidensity curve is defined in the horizontal direction of the shape of the glass plate 108. On the other hand, when the value of the variable p is varied while the value of the variable s remains unchanged, the density of the picture elements (x,y) is defined as gradually changing. That is, the density variation curve is defined in the vertical direction of the shape of the glass plate 108. When each picture element defined by the density variation curve and the equidensity curve is assigned with a predetermined degree of exposure and when the variable s has an arbitrary value in Eqs. (1) and (2), the exposure curve 111 as shown in FIG. 6 is defined. The exposure curve 111 is represented by the function of $D = F(p)$ which means that the exposure D varies in response to the variable p in the vertical direction. Thus, the variation of density in the y-direction on the glass plate 108 can be determined.

The exposure curve 111 shown in FIG. 13 indicates that from the mid-point between the first and second frames 109 and 110 to a portion adjacent to the second outer frame 110, the exposure remains unchanged. The portion of the exposure curve 111 from the mid-point thereof to a portion adjacent to the second outer frame 110 indicates that the exposure is gradually decreased in response to the variation in value of the variable p.

Next referring to FIG. 14, the steps for determining the exposure of respective picture elements in order to define the gradation pattern 105 on a glass plate 108 as shown in FIG. 12, will be described. As described above with reference to Eqs. (1) and (2), the value of the variable s shown in FIG. 25 changes from s=0 at the left end to s=W at the right end and the component in the vertical direction is defined as a vertical assignment line. On the other hand, the value of the variable p varies from p=0 at the first outer frame to p=H at the second outer frame and the component in the horizontal direction is defined as a horizontal assignment line.

In step 201, the above-described picture elements are initialized. That is, the exposure of all the picture elements of the shape of the glass plate 108 are set to 0.

In step 202, the value of the variable p is set to 0. That is, in FIG. 12, the picture element at the intersection between the first vertical assignment line with s=0 and the first horizontal assignment line with p=0 at the upper left portion in the same figure is first assigned with an exposure.

In step 204, at the picture element determined based on the values of the variables p and s in Eqs. (1) and (2), the value of p on the exposure curve 111 shown in FIG. 13 corresponding to the first-mentioned p is obtained and the degree of exposure to be assigned D is obtained in response to the value of p thus obtained.

When a given picture element assigned with the exposure D is represented by RAS (i,j) and i is substituted into Eq. (1) while j is substituted in Eq. (2), the following Eq. (3) is obtained.

$$RAS(GX(p,s),GY(p,s)) = F(p) \quad (3)$$

In step 205, after a predetermined degree of exposure is assigned to the picture element at the intersection of the first vertical assignment line with s=0 and the first vertical assignment line with p=0, the vertical assignment line is displaced toward the right end from the first vertical assignment line with S=0 by Δs to the second vertical assignment line with s=1.

In step 206, since the vertical assignment line has not yet indicated the right end, the program proceeds to the step 204 in which the same degree of exposure based on Eq. (3) is assigned to the picture element defined by the first horizontal assignment line with p=0 and the second vertical assignment line with s=1. In this manner, the picture elements defined on the first horizontal assignment line by from the first vertical assignment line with s=0 to the W-th vertical assignment line with s=W are all assigned to the same exposure. When the picture-element vertical line has the relationship of s≦W, the program proceeds to step 207.

In step 207, the horizontal assignment line is displaced by Δp from the first horizontal assignment line with p=0 to the second horizontal assignment line p=1.

In step 208, the condition p≦H has not yet been satisfied, that is, the horizontal assignment line has not yet reached the second outer frame 110, so that the program shifts to step 3. In step 203, s is set to 0. That is, the picture element to be assigned to the exposure is designated by the first vertical assignment line s=0 and the second horizontal assignment line with p=1.

In a similar manner, as shown in FIG. 12, depending upon the exposure curve, the picture elements from the mid-point between the first and second outer frames 109 and 110 to the position on the horizontal assignment line slightly adjacent to the second outer frame 110 are assigned to the same exposure with that described above.

After the respective picture elements have been assigned to the same exposure in the manner described above, whenever the horizontal assignment line is displaced to the second outer frame 110, the picture elements are assigned to the gradually decreasing exposure. In this case, in step 207, each picture element designated by every displacement of the horizontal assignment line by Δp is assigned to a gradually decreasing exposure.

In step 208, the condition p≦H is satisfied so that all the picture elements to the second outer frame 110 are assigned to the exposure. When the picture elements of the shape of the glass plate 108 are assigned to their exposure, the raster data is prepared and stored in the main storage device 102 and then transferred into the auxiliary storage device 103 when the raster data thus prepared is output from the scanner 104.

Thereafter, the photosensitive film is wound in the digital scanner 104 and then the raster data stored in the auxiliary storage unit 103, is output to the photosensitive film so that the film is exposed depending on the raster data. The original film 106 with the gradation pattern 105 is then prepared as shown in FIG. 9.

So far it has been described that the digital scanner 104 outputs the raster data by utilizing the auxiliary storage device 103, but it is to be understood that the raster data can be directly output to the digital scanner 104 from the main storage device 102.

25 Method (2)

When the gradation pattern is defined on the original film in the manner described above, a quasi-boundary line is generated in some cases. Therefore, the method for eliminating such quasi-boundary lines will be described hereinafter.

First, the quasi-boundary line will be explained. In order to define a gradation pattern on an original film, a digital scanner is utilized. The digital scanner processes the variations in exposure in terms of the digital variations so that band-shaped patterns tend to frequently appear on the formed gradation pattern. Especially, the greater the variations in exposure, the more frequently the band-shaped patterns tend to appear. Such band-shaped patterns are called "quasi-boundary lines". Therefore, the method for eliminating these quasi-boundary lines in accordance with the present invention can eliminate the quasi-boundary lines appearing on the original film, so that a satisfactory gradation pattern can be formed.

First, a quasi-boundary-line eliminating device for eliminating the quasi-boundary lines will be described. The quasi-boundary-line eliminating device 312 shown in FIG. 15 comprises an exposure arithmetic unit 313, a random-number generator 314, a multiplier 315, an adder 316 and a digital scanner 104.

Next, the mode of eliminating the quasi-boundary lines by utilizing the quasi-boundary-line eliminating device 312 with the above-described construction will be described. A quasi-boundary line tends to frequently appear at a portion of the original film 106 where the exposure varies in a wide range so that the step for eliminating the quasi-boundary lines is carried out at a portion where the exposure varies over a wide range. It is not necessary to carry out the quasi-boundary-line eliminating method at a portion on the original film 106 where the exposure remains unchanged.

First, in order to define a predetermined gradation pattern on an original film 106 as shown in FIG. 16, the exposure arithmetic unit 313 computes the exposure curve 111 as shown in FIG. 17. Regarding the method for defining the exposure curve 111, reference is made to the description of the exposure curve 111 with reference to FIG. 13 in the above-mentioned method (1). When the horizontal direction is represented by x while the vertical direction is represented by y in FIG. 16, the exposure curve 111 shown in FIG. 17 is expressed by the following equation:

$$D = f(y) \tag{4}$$

That is, when the value of y remains unchanged, the exposure D also remains unchanged regardless of the value of x. In other words, the exposure D varies in response to the variation in value of y in the vertical direction.

As described above, because of the variations in exposure D over a wide range, the quasi-boundary lines tend to frequently appear. When Eq. (4) is differentiated in order to obtain the derivative D' of the exposure curve 111, the following equation is obtained:

$$D' = dD/dy \tag{5}$$

Eq. (5) can be represented by the curve as shown in FIG. 17. The exposure D thus obtained is fed into the adder 316. The modes of operation of the adder 316 and the multiplier 315 will be described below.

The random-number generator 314 generates a random number R under the condition that $1 \leq R \leq -1$. The random numbers thus generated are sequentially delivered to the multiplier 315 when the gradation pattern 105 is being defined on the original film 106 as shown in FIG. 16.

The multiplier 315 executes the multiplication of the random number R, the exposure derivative D' obtained from Eq. (5) and a constant k. The result of the multiplication is a "deviation" which occurs at a portion of the exposure curve 111 in which the exposure varies over a wide range as shown in FIG. 19. The constant k is determined depending upon the width or amplitude of the "deviation". The "deviation" is delivered from the multiplier 315 to the adder 316 which adds the "deviation" to the exposure D obtained from Eq. (4). That is, the following computation is executed:

$$D_n = D + k \cdot D' \cdot R \qquad (6)$$

This equation (6) means that the "deviation" obtained by the multiplier 315 is imparted to a portion of the exposure curve 111 at which exposure varies over a wide range as shown in FIG. 17. As a result, when the gradation pattern 105 is being defined on the original film 106 as shown in FIG. 16, the "deviation" is imparted to a portion in which the exposure D varies over a wide range, so that the quasi-boundary line can be eliminated.

Method (3)

Next, a method for effecting the quasi-increase of exposure gradation of the digital-scanner will be described in order to obtain a more uniform and natural gradation pattern.

First, the term "quasi-increase of exposure gradation" will be explained. When the gradation pattern 105 is formed over the surface of the original film 106, the digital scanner 104 is utilized. The gradation pattern 105 is defined in response to the raster data derived from the digital scanner 104. The raster data consists of picture elements assigned to their exposure, but however correctly the exposure assigned to each picture element is computed, the range of exposure processing carried out by the digital scanner 104 is limited. For instance, even when the exposure of the computation data 417 is computed down to some places of decimals as shown in FIG. 20, the digital scanner 104 can handle only the integers so that the original film 106 is converted into a raster data 418 whose contents are shown in FIG. 21. That is, the decimal number of the exposure is eliminated so that the exposure becomes an integer. Although not shown, even when the decimal number or a fraction is raised to a unit, the whole data still consists of integers. As a result, however correctly the exposure is computed, it inevitably becomes an integer so that it is not expected that the gradation pattern 105 be defined by the correct exposure. In order to solve this problem, an offset is added to a desired computed exposure and the sum of the offset and the desired exposure is arithmetically processed to compute the integral exposure approximating the desired exposure. Such computation process is called the quasi-increase of exposure gradation.

A method for effecting the quasi-increase of exposure gradation will be described. A device for carrying out the method for effecting the quasi-increase of exposure gradation is shown in FIG. 22. The device for effecting the quasi-increase of exposure gradation 419 comprises an exposure storage device 420, an offset generator 421, an adder 416, a digital scanner 104 and a control unit 422.

The computed data 417 as shown in FIG. 20 is stored in the exposure storage device 420 and consists of picture elements 242 which have been already assigned to their exposure. That is, the exposure storage device 420 is connected to the arithmetic unit for computing the exposure. Regarding the assignment of the exposure to respective picture elements 423, reference is made to the method described in detail with reference to FIGS. 11–14 in the method (1).

A reference offset 424 as shown in FIG. 23 is stored in the offset generator 421. The reference offset 424 consists of a unit of at least picture elements 243. These four picture elements 423 have the directivity corresponding to the x- and y-directions of the computed data 417 shown in FIG. 20. When the upper left picture element 423 of the reference offset 424 is represented by (x=1, y=1), then the offset is zero; the offset of the picture element (x=2, y=1) is 0.5; the offset of the picture element (x=1, y=2) is 0.75; and the offset of the picture element (x=2, y=2) is 0.25. These offsets are selected on the basis of the results of experiments and each offset may be varied within a limited range.

In response to the offset output instruction from the control unit 422, the offset generator 421 reads out the construction of picture elements of the computed data derived from the exposure storage device 420 as shown in FIG. 22. That is, the offset generator 421 reads 16 (sixteen) picture elements in the x-direction and three picture elements in the y-direction. Thereafter, the generated offset storage device 421 forms an arrangement frame 425 in which 16 (sixteen) offsets and three offsets corresponding to the construction of the picture elements of the computed data 417 shown in FIG. 20 in the x- and y-directions, respectively, are arranged, and the upper left of FIG. 24 is represented by (x=1, y=1). Next, the reference offset as shown in FIG. 23 is allocated in the offset arrangement frame 425. In this case, the offset 424 (x=1, y=1) shown in FIG. 23 and the (x=1, y=1) in the arrangement frame shown in FIG. 24 are used as references, respectively, and the odd-numbered rows and even-numbered rows in the x-direction of the reference offset 424 shown in FIG. 23 are allocated at the odd- and even-numbered rows, respectively, in the x-direction of the arrangement or allocation frame 425 shown in FIG. 24. This allocation is continued until the odd-numbered row and the even-numbered row (x=15, x=16) are written in FIG. 24.

Thereafter, (x=1, y=3) shown in FIG. 24 is added to (x=1, y=1) of the reference offset 424 shown in FIG. 23 and then the sum is allocated in the odd- and even-numbered rows in the x-direction of the allocation frame 425 shown in FIG. 24. This allocation is continued until the odd- and even-numbered rows (x=15, x=16) shown in FIG. 24. Thus, the offsets allocated in the allocation frame 425 shown in FIG. 24 are called the offset data 426.

After the offset generator 421 has formed the offset data 426, the latter is delivered to the adder 416. On the other hand, the computed data 417 shown in FIG. 20 is delivered to the adder 416.

The adder 416 executes the addition of the exposure of the computed data 417 shown in FIG. 20 and the offsets shown in FIG. 24 in the x- and y-directions, respectively, and the result of this addition is the offset processing data 427 shown in FIG. 25. The adder 416 discards the fractions of all the values in the offset processing data 427. The result shown in FIG. 26 of such arithmetic operation is the raster data 418 prepared by the computation of the exposure in accordance with the method of the present invention described above.

In response to the exposure instruction delivered from the control unit 422 to the digital scanner 104, the raster data 418 is delivered to the digital scanner 104 from the adder 416 and the digital scanner 104 defines the gradation pattern 105 over the surface of the original film 106 based upon the raster data 418.

The raster data 418 shown in FIG. 26 and prepared by the method for effecting the quasi-increase of digital scanner exposure gradation in accordance with the present invention, will be now compared with the conventional raster data 418 shown in FIG. 21.

In FIG. 21, the exposure is zero at (x=1, y=1), (x=2, y=1), (x=1, y=2), and (x=2, y=2), while in FIG. 26, the exposure is zero at (x=1, y=1) and is 1 at (x=2, y=1), (x=1, y=2), and (x=2, y=2). It therefore follows that the raster data 418 shown in FIG. 26 represents more correct exposure than the raster data shown in FIG. 21. In the case of the above-described raster data comparison, only one portion, respectively, of both the raster data are compared with each other, but the comparison between the exposure in the x- and y-directions, respectively, of both the raster data shown in FIGS. 21 and 26 shows that the exposure as shown in FIG. 26 is more correct than the exposure shown in FIG. 21.

Figure 27:
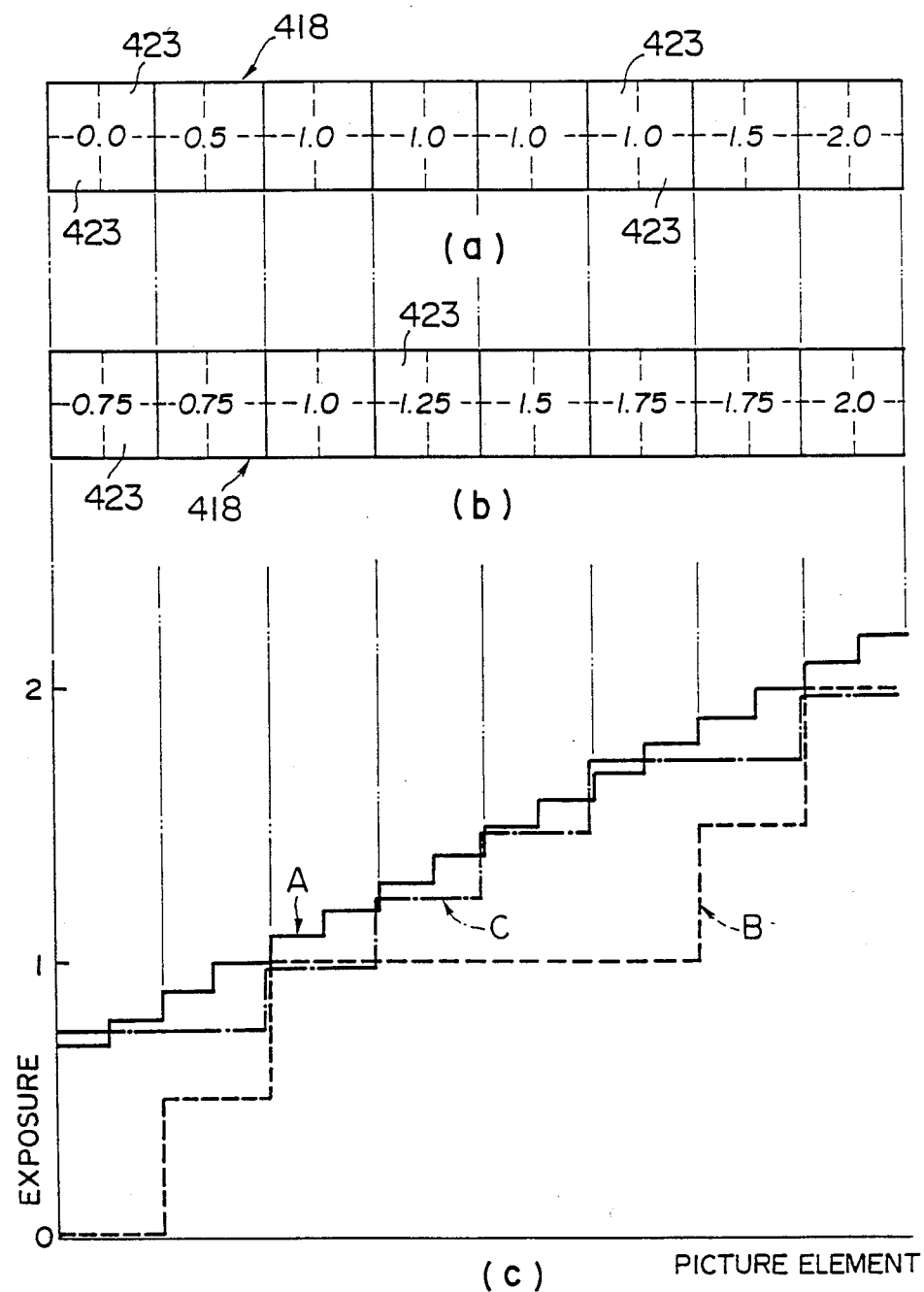
FIG. 27 is a view used to explain the exposure characteristic.

Next, the raster data comparison will be described in more detail. First, the exposure of the raster data 418 in two rows in the x-direction and indicated by y=1 and y=2 is divided into a plurality of groups each consisting of four picture elements and the raster data 418 which represents the average exposure of the exposure allocated to four picture elements is shown in FIG. 27(A). Next the exposure in two rows in the x-direction and indicated by y=1 and y=2 of the raster data 418 obtained by the method for effecting the quasi-increase of digital scanner exposure gradation in accordance with the present invention as shown in FIG. 26 is divided into a plurality of picture element groups each consisting of four picture elements and the raster data 418 which represents the average of the exposure allocated to the four picture elements is shown in FIG. 27(B). The raster data 418 shown in FIG. 27(B) and the raster data 418 as shown in FIG. 27(A) are represented in the form of graph in FIG. 27(C). In this graph, the ideal exposure characteristic of the computed data 417 as shown in FIG. 20 is represented by A; the exposure characteristic of the conventional raster data shown in FIG. 27(A), by B; and the exposure characteristic of the raster data 418 processed by the offsets as shown in FIG. 27(B), by C. As is apparent from this graph, the conventional exposure characteristic B is considerably deviated from the exposure characteristic A and the exposure characteristic C processed by the offsets is similar to the ideal exposure characteristic A. It follows, therefore, that when the gradation pattern 105 is defined over the surface of the original film 106 in accordance with the method for effecting the quasi-increase of digital scanner exposure gradation, the exposure can be approximated to the computed desired exposure, so that the exposure becomes correct.

When the exposure storage device 420 of the device for effecting the quasi-increase of the digital scanner exposure gradation as shown in FIG. 22 is connected to the output of the adder 316 in the quasi-boundry-line eliminating device 312 described above with reference to FIG. 15 in the method (2), the quasi-boundary lines can be eliminated and it becomes possible to define the gradation pattern 105 with the desired and correct exposure.

Method for Eliminating Density Gradient

In the case of the definition of the gradation pattern in the manner described above, even when the digital processing is carried out to obtain an original film in which the density is uniformly distributed and when the gradation pattern is printed on the transfer sheet through the process plate making step and the printing plate making step, stepwise density variations, which are unavoidable in the case of forming an image, are observable by the naked eye. It has been considered that the stepwise density variations are caused by the characteristics or nature of the human visual function.

According to the present invention, in order to eliminate such stepwise density variations which unavoidably appear, the following various means are utilized in the step for making a process plate, the step for making a printing plate and the step for printing as will be described below:

(1) Processing in Process Plate (Film) Making Step

Figure 28:
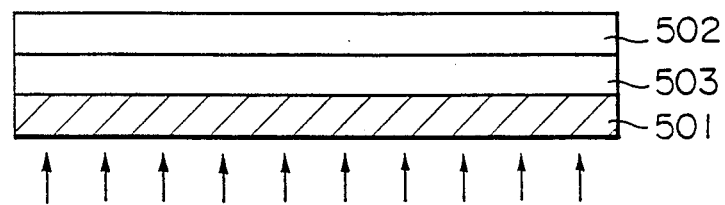
FIG. 28 is a sectional view illustrating the plate-making step.

1 As shown in FIG. 28, when the original film 501 is made into contact with an unexposed film 502 to expose it, thereby obtaining a process film, a light diffusion sheet 503 is sandwiched between the two films 501 and 502 so that the process film having no stepwise density variation can be obtained.

2 Method for Utilizing Scanner

Figure 29A:
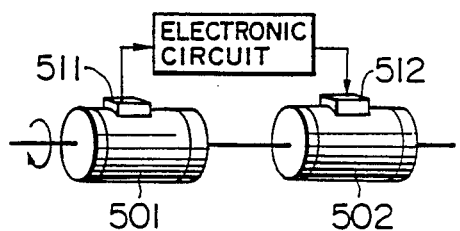
FIG. 29A is a view showing the construction of a scanner.
Figures 29B, 29C:
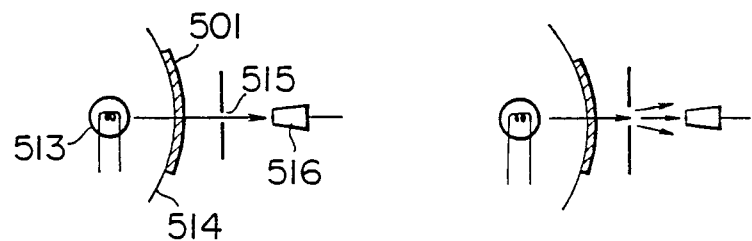
FIG. 29B and FIG. 29C are sectional views showing the scanning heads of the scanners.

As shown in FIG. 29A, when the pattern on the original film 501 is recorded over an unexposed film 502 by utilizing a scanner, the focal point of the scanning head (input scanning unit) 511 on the side of the original film 501 is defocused so that the recording mode of a recording head 512 can be made insensitive. FIG. 29B is a sectional view of the scanning head 511 and, in general, the light beam emitted from a light source 513 impinges on a photosensor 516 through a cylinder 154, the original film 501 and an aperture 515. As shown in Fig. 29C, when the aperture 515 is enlarged, the input light is dispersed so that the recording light delivered from the recording head 512 becomes vague. Consequently a process film with the decreased stepwise density variations can be obtained.

Instead of varying the aperture in the manner described above, when a light diffusion sheet is laid over the surface of the original film 501 or the unexposed film 502 in FIG. 29B, a process film image having no stepwise density variation can be obtained.

3 Method for Utilizing Reducer and Intensifier

The stepwise density variation problem can also be solved by applying a reducer (an agent for decreasing the density of a film, thereby increasing transmittance) or an intensifier (an agent for increasing the density of a film, thereby decreasing transmittance) over a portion of the surface of the original film where the stepwise density variations are observed.

(2) Processing in Step for Making Printing Plates

In the case of making a printing plate (film) by utilizing an electronic photoengraving machine (heliocushiongraphy), when the scanning head (input scanning unit) of the engraving machine is defocused, the stepwise density variations can be decreased. It is also possible to decrease the stepwise density variation by interposing a light diffusing sheet between the scanning head and the process film.

In the case of conventional gravure printing, when a light diffusing sheet is sandwiched between the plate film and carbon tissue and then exposure is made, the stepwise density variations can be eliminated on the surface of the printing plate as in the case of the process plate making.

(3) Processing in Printing Step

In the printing step, it is especially preferable to use a double-printing method (that is, a method for printing the same pattern twice) in order to eliminate the stepwise density variations unavoidably produced in the gradation patterns. According to this method, two printing plates are made from the same original plate and are used to print a transfer sheet two times.

In this case, each printing is carried out in such a way that a degree of print density is substantially equal to one half of the desired density. It is essential that in the second printing step, the second printing position be displaced by a predetermined distance from the first printed position toward a low density portion (that is, a lower density portion of a gradation pattern). When two printings are made by displacing the printing position in the manner described above, in the second printing step, the pattern is printed over a portion or region in which the stepwise density variations remain in the first printing step after the second printing position is displaced by a predetermined distance from the first printing position, so that the stepwise density variations resulting from the two printing steps cancel each other. Consequently the printed image or pattern having no stepwise density variation can be obtained.

Figure 30A:
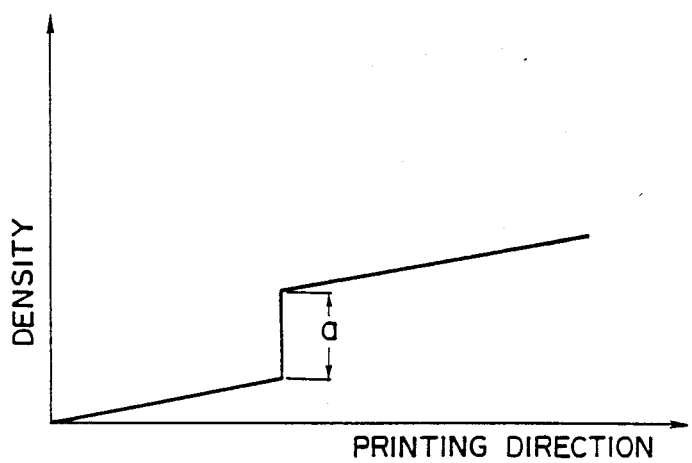
FIG. 30A and FIG. 30B are graphs illustrating the variations in printed density.
Figure 30B:
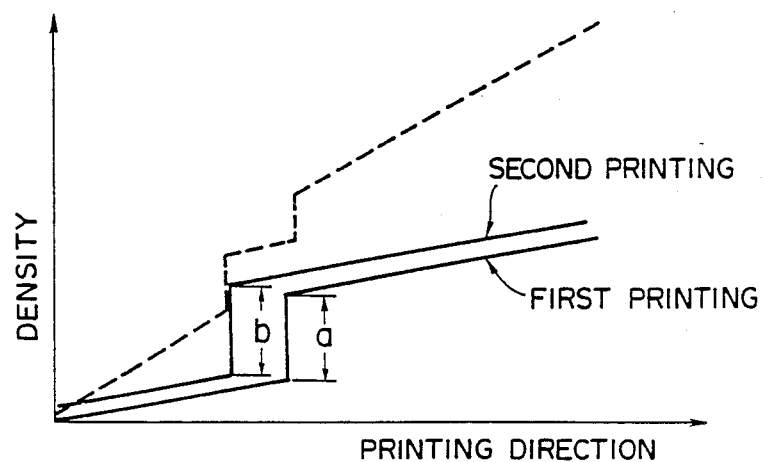

This method will be described in more detail with reference to FIG. 30. First, in the first printing the gradation pattern having a stepwise density variation a at a specific portion is printed as shown in FIG. 30A. Next, as shown in FIG. 30B, in the second printing step, the gradation pattern is printed again at a position displaced by a predetermined distance from the first printed position of the gradation pattern. In the second printing step, the printed gradation pattern also has a stepwise density variation b, but when the first and second printed gradation patterns are superposed one upon another, the resulting gradation pattern with decreased stepwise density variations indicated by the broken line (that is, the steps of the density variations are further decreased) is formed.

The above-described methods for eliminating the stepwise density variations can be used in various combinations.

Next, some examples of the present invention will be described.

EXAMPLE A-1

While the line density was maintained at 70 lines/cm, the cell depth was continuously varied from 40-1 microns, whereby a gravure printing plate having an arcuate vignette pattern, that is, the pattern for coloring large areas on both the right and left ends as compared with the remaining portion, was prepared.

The ink with the following composition was prepared. (Parts are defined as parts by weight.)

| | |
|---|---|
| polyvinylbutyral powder | 5 parts |
| isopropyl alcohol | 20 parts |
| ethyl acetate | 65 parts |
| disperse dye "Diaserinfast Navy Blue 5B (produced by Mitsubishi Kasei K.K., Japan) | 10 parts |
| | Total: 100 parts |

Over a coat paper (KDS-A, the product of Kanzaki Seishi K.K., Japan) printing was done by a gravure process by using the above-mentioned gravure printing plate and ink, whereby a transfer sheet was prepared.

The solution with the following composition was prepared.

| | |
|---|---|
| polyvinylbutyral powder | 5 parts |
| cyclohexanol | 45 parts |
| toluene | 50 parts |
| | Total: 100 parts |

The above-mentioned solution was applied over the pattern on the transfer sheet by using the coating rod (Mayer's bar (No. 6)).

The transfer sheet was superposed over a polyvinylbutyral sheet (the product of Mitsubishi Monsant K. K., Japan) of 760 microns in thickness and having fine projections and valleys (surface roughness 26.5 microns) on the surfaces thereof and they were pressed against each other by a flattening press under the pressure of 0.5 kg/cm$^2$, at 30° C. and for 60 seconds. Thereafter the pressure was relieved and the coat paper which is the substrate of the transfer sheet was separated, whereby a decorative intermediate film for use in a laminated glass sheet with the above-described pattern transferred over and impregnated into the polyvinylbutyral sheet was obtained. The reduction in surface roughness was less than 10%.

The decorative intermediate film thus fabricated was stored with a drying agent and was satisfactorily dried.

The dried decorative intermediate film was sandwiched between two glass plates of the windshield of the automotive vehicle and the de airing operation was carried out satisfactorily by using rolls and the lamination thus obtained was pressed by a flattening press under the pressure of 0.5 kg/cm$^2$, at 110° C. for five minutes, whereby the laminated glass sheet having a light absorption band in the form of an arcuate vignetted pattern was obtained.

When the laminated glass sheet thus obtained was left in the atmosphere at 55° C. for five days, the color produced by the dye became more uniform in quality and was further enhanced.

EXAMPLE A-2

The ink with the following composition was prepared.

| | |
|---|---|
| polyvinylbutyral powder | 5 parts |
| isopropyl alcohol | 30 parts |
| toluene | 55 parts |
| disperse dye "Kayaron Polyester Blue CR-E" | 10 parts |
| | Total: 100 parts |

By using the gravure printing plate and the above-mentioned ink, the printing was made on the coat paper similar to that described in Example A-1 by a gravure process, whereby a transfer sheet was obtained.

The solution with the following composition was prepared.

| | |
|---|---|
| polyvinylbutyral powder | 10 parts |
| cyclohexanol | 45 parts |
| methylethyl ketone | 25 parts |
| toluene | 20 parts |
| | Total: 100 parts |

The transfer sheet was coated with the above-mentioned solution by using the coating rod.

The transfer sheet thus obtained was superposed over a polyvinylbutyral sheet similar to that used in Example A-1 and they were pressed against each other by a flattening press (under the same conditions as those described in Example A-1). Thereafter the pressure was relieved and the coat paper was separated, whereby a decorative intermediate film for use in a laminated glass sheet with an arcuate vignetted pattern transferred over and impregnated into the polyvinylbutyral sheet was obtained. In this case, the decrease in the surface roughness of the decorative intermediate film was also less than 10%.

The decorative film was stored with a drying agent and was satisfactorily dried.

The dried decorative intermediate film was sandwiched between two glass plates of the windshield of the automotive vehicle and the de-airing operation was carried out to a sufficient extent by using rollers and the lamination was pressed by the flattening press (under the same conditions as those described in Example A-1), whereby a laminated glass sheet with a light absorbing band in the form of an arcuate vignetted pattern was obtained.

EXAMPLE B-1

An original was prepared to have a gradation pattern which, in turn, had an arcuate pattern defined on a drawing and the density pattern continuously defined in the direction from the bottom to the top of the arcuate pattern.

In the case of the preparation of such pattern, first the positions and density are converted into the digital values by the computer and the original film (original) was obtained by the output exposure under the adjusted scanning condition.

Thereafter, by using the electronic engraving machine (Helicocushiongraphy, the product of Hell Corp.), defined on the cylinder having the circumference of 620 mm were two gravure printing plates each having an arcuate vignette pattern with the density curve defined under the conditions that the line density was 54 lines/cm and the angle was zero.

Both the first and second printing plates had the same density curve. The registration marks of the printing plates were adjusted and the printing was made in such a way that when the second printing plate was superposed, the ink application positions of the first and second printing plates were spaced apart from each other by 13 mm. The pattern thus prepared was printed in such a way that the printed pattern had a predetermined density and had no stepwise density variations. The printing was carried out in the following manner.

A betacoat plate with the engraved depth of 40 microns was set over the first unit of the gravure printing press and the pattern plates prepared in the manner described above were set on the second and third units, respectively. The electrostatic gravure printing devices "Heliophone" (the product of Spenglar Corp., Switzerland) were incorporated in the second and third units.

The coat paper "KDC-A" (the product of Kanzaki Seishi, Japan) with the basis weight of 60 g/m² was used as a substrate and the primer coating solution prepared by the manner to be described below was applied to the first unit and the ink prepared by the manner to be described below was used at the second and third units during the printing step.

The primer coating solution had the following composition:

| | |
|---|---|
| polyvinylbutyral powder (with a medium polymerization degree) | 5.0 parts |
| isopropyl alcohol | 47.5 parts |
| ethyl acetate | 47.5 parts |

The above-mentioned substances were melted in the mixture to obtain the primer coating solution. The viscosity of the solution thus prepared was 11 seconds on Iwata type cup scale.

The ink had the following composition:

| | |
|---|---|
| polyvinylbutyral powder | 5.0 parts |
| isopropyl alcohol | 20.0 parts |
| ethyl acetate | 65.0 parts |
| Solvent Blue 83 | 10.0 parts |

The above-mentioned substances were kneaded in a ball-mill type kneading machine for 24 hours to produce the ink.

Next, a varnish with the following composition was prepared.

| | |
|---|---|
| polyvinylbutyral powder | 5.0 parts |
| isopropyl alcohol | 20.0 parts |
| ethyl acetate | 65.0 parts |

The ink and the varnish were mixed at a ratio of 1:1 and the mixture was used at the second and third units. The viscosity was 14 seconds on Iwata type cup scale.

The printing conditions were that the printing speed was 60 m/min; the Heliophone output was 80%; and the pressure was 4 kg f/cm².

The print obtained was an arcuate vignette pattern with a smooth density curve having a continuous gradation. Thereafter, the rolled print was cut to a predetermined size to produce the transfer sheets.

The transfer coat solution (solvent liquid) with the following composition was prepared by using the mixer.

| | |
|---|---|
| polyvinylbutyral powder | 5 parts |
| cyclohexanol | 45 parts |
| toluene | 50 parts |

The viscosity was 120 seconds (at 10° C.) on the Zarn cup No. 3 scale. The coating liquid thus prepared was coated over the printing surface of each transfer sheet obtained in the manner described above.

Thereafter, the above-mentioned coating liquid was applied to the surfaces of a polyvinylbutyral sheet 760 microns in thickness and having fine projections and valleys (that is, the surface roughness was 265.5 microns) and then the transfer sheet was immediately superposed over the surface of the polyvinylbutyral sheet. After the rear surface of the transfer sheet was rubbed so that it was made into intimate contact with the polyvinylbutyral sheet, they were pressed against each other by the flattening press under the pressure of 0.5 kg/cm² at 30° C. for 60 seconds.

Next, the coat paper which is the substrate of the transfer sheet was separated and it was then observed that the above-mentioned printed pattern was satisfactorily transferred over and impregnated into the upper surface layer of the polyvinylbutyral sheet. Thus, a decorative intermediate film for use in a laminated glass sheet having a blue vignette pattern was obtained.

The surface roughness of the decorative intermediate film was less than 10%, which is sufficiently satisfactory in practice.

The decorative intermediate film was stored with a drying agent and was satisfactorily dried.

The dried decorative intermediate film was sandwiched between two glass plates of the windshield of the automotive vehicle and the de-airing operation wa carried out completely. Thereafter, the lamination was pressed by the flattening press under the pressure of 0.5 kg/cm$^2$ at 110° C. for five minutes, whereby the laminated glass sheet having a light absorption band in the form of an arcuate vignette pattern was obtained.

When the laminated glass sheet was left in the atmosphere at 55° C. for five days, the color produced by the dye became more uniform and was enhanced further.

EXAMPLE B-2

The printing in Example B-2 was carried out in a manner substantially similar to that described above with reference to Example B-1 except that the first and third units in the gravure printing press and the electrostatic gravure printing devices were not used. In the second unit, the ink with the following composition prepared by kneading for 24 hours in a ball-mill type kneading machine was used as a gravure ink. The printing conditions were that the printing speed was 60 m/min.; EP solution with the following composition was prepared:

| | |
|---|---|
| polyvinylbutyral (medium polymerization degree) | 3.3 parts |
| polyvinylbutyral (heavy polymerization degree) | 2.6 parts |
| cyclohexanol | 30.0 parts |
| MEK | 15.3 parts |
| toluene | 48.3 parts |

The transfer coating solution having the viscosity unit of 120 seconds (at 10° C.) on the Zarn cup No. 3 scale was applied over the printing surface of the transfer sheet cut from the transfer sheet roll in the manner described above, by the coating rod. The applied quantity was 6 g/m$^2$.

Thereafter, following the procedure of Example B-1, the transfer sheet was superposed over the surface of a polyvinylbutyral sheet to transfer a pattern. Thus, a decorative intermediate film for use in a laminated glass sheet having a blue-colored vignette pattern formed by the transfer and impregnation of the pattern was obtained.

The surface roughness of the decorative intermediate film was less than 10%, which is satisfactory in practice.

The decorative intermediate film was stored with a drying agent and dried completely.

The dried decorative intermediate film was sandwiched between two glass plates of the windshield of the automotive vehicle and the de-airing operation was satisfactorily carried out by using the rollers. Thereafter, the lamination was pressed by the flattening press under the pressure of 0.5 kg/cm$^2$ at 110° C. for five minutes, whereby the laminated glass sheet having the light absorption band in the form of an arcuate vignette pattern was obtained.

The laminated glass sheet thus obtained was transparent and had a vignette pattern having the density curve defined by the continuous gradation from the deep colored portion to the light colored portion.

EXAMPLE B-3

The transfer coating solution with the following composition was prepared and applied over the surface of a polyvinylbutyral sheet 760 microns in thickness and having fine projections and valleys over the surface (that is, the surface roughness was 26.6 microns). The applied quantity in the wet state was 20 g/m$^2$.

The printing surface of the transfer sheet prepared in the manner described in Example B-1 was immediately superposed over the surface of the polyvinylbutyral sheet and then the rear surface of the transfer sheet was lightly rubbed to make it into intimate contact with the polyvinylbutyral sheet. Thereafter, they were forced against each other by the flattening press under a pressure of 2.0 kg/cm$^2$ at 20° C. for 60 seconds.

Next, the coat paper which was the substrate of the transfer sheet was separated, so that the polyvinylbutyral sheet having the above-described pattern transferred over and impregnated into the surface thereof was obtained. In the above-described manner, the intermediate film with the blue-colored vignette pattern was obtained.

The surface roughness of the decorative intermediate film was less than 10%, which is satisfactory in practice.

The decorative intermediate film was then stored with a drying agent and dried completely.

The dried decorative intermediate film was sandwiched between two glass plates of the windshield of the automotive vehicle and the de-airing operation was carried out completely. Thereafter, the laminate was pressed by the flattening press under the pressure of 0.5 kg/cm$^2$ at 110° C. for five minutes. Thus, the laminated sheet having the light absorption band in the form of an arcuate vignette pattern was obtained.

The laminated glass sheet thus obtained was transparent and had a vignette pattern having the density curve defined by the continuous gradation from the heavy colored portion to the light colored portion.

INDUSTRIAL APPLICABILITY

The decorative intermediate film for use in a laminated glass sheet produced by the method of the present invention contains no residual air bubbles when it is used as an intermediate film between the adjacent glass plates of a laminated glass sheet. Thus, the laminated glass products which are uniformly colored and have an attractive outer appearance can be obtained at a high yield. It therefore follows that the present invention is very advantageous in the case of the manufacture of not only windshields of automotive vehicles but also various glass plates for, for example.

I claim:

1. A method for producing a laminated glass sheet, sequentially comprising the following steps:
    depositing a printing ink onto a transfer sheet substrate to form a printed pattern surface on said transfer sheet substrate;
    applying a solvent to said pattern surface and an intermediate film for softening a vehicle of said printing ink and a vehicle of said intermediate film, said intermediate film being made of a thermoplastic resin and having fine projections and recesses on both surfaces thereof;
    superposing said pattern surface having said solvent applied thereon onto said intermediate film;

pressing said superposed pattern surface into said intermediate film at a temperature below a glass transition point of said intermediate film;

separating said transfer sheet substrate from said intermediate film having said pattern surface pressed therein;

drying said intermediate film; and interposing said intermediate film between two glass sheets and pressing said glass sheets together while heating, thereby forming said laminated glass sheet.

2. The method of claim 1, wherein said intermediate film comprises a polyvinylbutyral sheet.

3. The method of claim 1, wherein said printing ink and said intermediate film contain at least one similar substance.

4. The method of claim 1, wherein said temperature of said pressing step is not more than 30° C.

5. The method of claim 1, wherein said pattern surface consists of a vignette pattern having a uniform density gradient.

6. The method of claim 1, said depositing step further comprisnig making an original film used to define said pattern surface, preparing a process film and making a printing film.

7. The method of claim 6, wherein said pattern surface consists of a vignette pattern having a uniform density gradient.

8. The method of claim 6, said step of making said original film further comprising producing gradation pattern information based upon a desired shape and a desired density gradient and forming a gradation pattern on a film responsive to said gradation pattern information.

9. The method of claim 8, wherein said vignette pattern is without quasi-boundary lines.

10. The method of claim 6, wherein said depositing step is carried out twice.

11. The method of claim 1, wherein a variation in surface roughness of said intermediate film after said pressing step is not more than 10%.

12. The method of claim 1, wherein said pattern surface is permeated to a rear surface of said intermediate film during said superposing and said pressing steps.

* * * * *